Jan. 28, 1958 C. W. RANTALA 2,821,429
VEHICLE BODY DRAINAGE AND SEALING MEANS
Filed Sept. 19, 1956
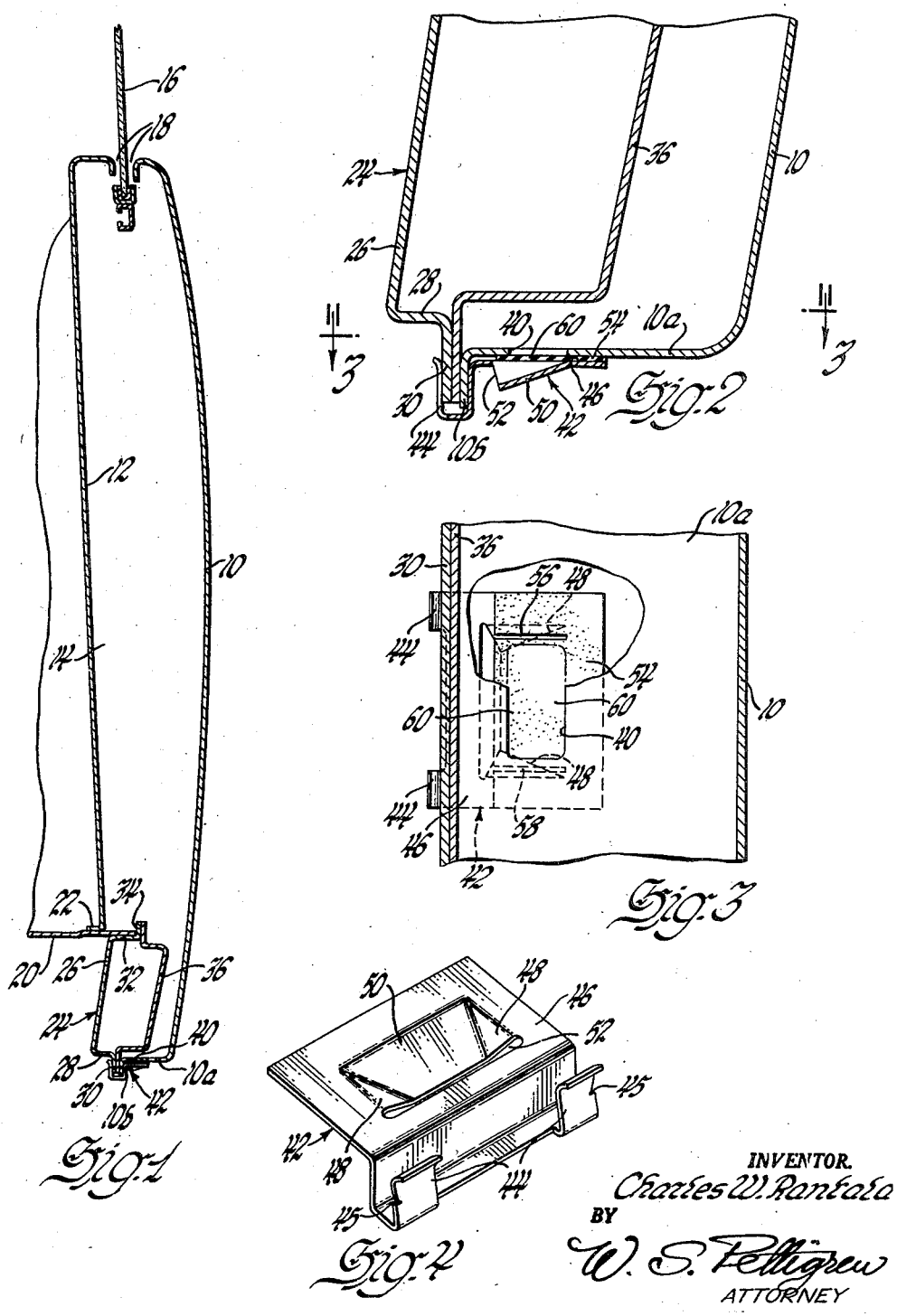
INVENTOR.
Charles W. Rantala
BY
W. S. Pettigrew
ATTORNEY

United States Patent Office 2,821,429
Patented Jan. 28, 1958

2,821,429

VEHICLE BODY DRAINAGE AND SEALING MEANS

Charles W. Rantala, Wyandotte, Mich., assignor to General Motors Corporation, Detroit, Mich., a corporation of Delaware Application September 19, 1956, Serial No. 610,843

6 Claims. (Cl. 296—28)

This invention relates to automobile body sealing means, and more particularly to a sealing device including a flap valve for draining a portion of an automobile body structure.

One feature of the invention is that it provides improved sealing means for an automobile body; another feature of the invention is that it provides a clip-on device incorporating a flap valve, which is particularly adapted for sealing a drainage opening in an automobile body; still another feature is that the device may be mounted on an automobile body without drilling holes or otherwise modifying the automobile body structure; a further feature of the invention is that it comprises a clip member having a holding portion and an integral body portion with a centrally depressed trough with an opening therein and a flap valve mounted on the body portion and having a flexible flap portion covering said trough; and an additional feature of the invention is that the clip member and flap valve cooperate with a body panel of the automobile to provide one-way valve action.

Other features and advantages of the invention will be apparent from the following description and from the drawings, in which:

Fig. 1 is a vertical transverse section through the rear quarter portion of an automobile body;

Fig. 2 is an enlarged detail section of a portion of Fig. 1;

Fig. 3 is a horizontal section taken along the line 3—3 of Fig. 2; and

Fig. 4 is an isometric view of the clip member, the flap valve being removed.

The rear quarter portion of an automobile body is formed of inner and outer panels to provide a box-like space into which the rear quarter window descends when the window is lowered. Moisture may enter this box-like space through the window opening in the upper edge of the rear quarter panel, and one or more drainage openings conventionally have been formed in the lower portion of the box-like section to permit the water to drain out of the body. However, the box-like space communicates with the interior of the automobile through that portion of the above-mentioned window opening on the inner side of the window glass, and if a constantly open drain opening is provided, dust will be drawn into the interior of the automobile. When the automobile is driven at moderate or high speeds, the rush of air past the body creates a degree of vacuum inside the automobile body so that suction causes dust to be drawn through the drain holes into the box-like space in the rear quarter section and this dust is drawn by suction through the window opening in the rear quarter panel into the interior of the automobile. The degree of vacuum is increased if one or more of the windows is open.

This invention provides a simple clip-on device incorporating a flap valve for sealing the drain opening against the entry of dust while permitting water to drain through the opening. The clip-on device may be mounted on the automobile body without the necessity of drilling holes in the body panel, providing special drain channels, or making any other modifications in the body panels. The flap valve cooperates with a body panel to provide a one-way valve action, permitting drainage of moisture from the box-like space but preventing the entry of dust into this space through the water drain opening.

Referring now more particularly to the drawings, in an automobile body a substantially vertical outer rear quarter panel 10 forms the outer body shell rearwardly of the doors and an inner rear quarter panel 12 is arranged in generally parallel relationship to and spaced from the outer panel 10 to provide a box-like space 14 into which a rear quarter window 16 may descend when the window is lowered. As shown in Fig. 1, an opening 18 for the window is provided along the top edges of the panels 10 and 12, these edges being turned toward each other but terminating short of each other to form the opening 18. Part of the opening 18 is outside the window 16 and part of the opening is inside the body relative to the window. The inner rear quarter panel 12 terminates at its lower end at the floor panel 20 of the automobile body, the lower edge of the inner rear quarter panel 12 having an inturned flange 22 which is secured to the floor panel by welding or by other means. The outer rear quarter panel 10 extends downwardly below the level of the floor 20 and has a substantially horizontal lower portion 10a which extends inwardly and terminates in a downturned flange 10b.

A rocker panel designated generally as 24 has a generally vertical body portion 26 and a substantially horizontal lower outwardly extending edge portions 28 terminating in a downturned flange 30 which, with the flange 10b, forms the lower edge of the body. At its top the rocker panel is formed with an outwardly extending generally horizontal portion 32 which underlies the floor 20 and is flanged upwardly at 34 at the edge of the floor. A reinforcing member 36 is joined to the rocker panel to form a stiffening girder. At the top the reinforcing member is welded to the flange 34 and at the bottom it is clamped between the flanges 30 and 10b and welded thereto. The outer rear quarter panel 10 and the rocker panel 24 form exterior walls of the automobile body, and one or more drainage openings 40 are formed in the horizontal portion 10a of the rear quarter panel 10 to drain water which collects in the space 14 through the exterior body wall. It will be seen from Fig. 1 that the two rear quarter panels, in combination with the rocker structure, encompass the box-like space 14, which is closed except for the drainage opening 40 in the bottom and the window opening 18 at the top. While a drainage opening is essential in order to avoid an accumulation of water in the space 14, if the drainage opening 40 were left open, the partial vacuum condition created inside the automobile body when the automobile is moving at moderate or high speeds would cause dust, which is stirred up by the wheels of the automobile, to be sucked into the space 14 through the drainage opening 40 and then to be sucked into the interior of the automobile through that portion of the opening 18 which is inside the window 16.

In order to avoid this undesirable entry of dust into the automobile body, sealing means are provided including a clip member incorporating a flexible flap valve which blocks the drain opening 40 and prevents dust from being sucked through this opening but which allows moisture to drain out through the opening 40.

The sealing means comprises a clip-on member designated generally as 42. As shown best in Fig. 4, the clip-on member has U-shaped holding portions in the form of clips 44 which are adapted to be clipped to an edge of a body panel, as to the lower edge formed by flanges 10b and 30 as shown in Figs. 1, 2 and 3. Preferably, the member 42 is formed of metal and the clip portions 44 have spring steel resiliency. A barb 45 is bent out of each of the clip portions 44 to increase the frictional grip of the spring clips. An integral body portion 46 extends at a right angle from the U-shaped holding portion of the clip and is formed with a centrally depressed punched trough having opposite sloping sides 48, a sloping base 50, and a steep open face 52. The clip 42 is so designed that when it is clipped over the flanged lower edge of the body structure opposite the drain opening 40, the centrally depressed trough in the body of the clip lies under the drain opening 40 so that water draining through the body opening 40 may run out of the body through the valve opening 52.

A flap valve is mounted on the body portion of the clip and is so arranged that it prevents the entrance of dust into the space 14 through the opening 40 but permits water to drain through this opening. The flap valve is formed of rubber and is cemented to the body portion 46 of the clip on the three walled sides of the trough, being unattached to the clip adjacent the open face 52 of the trough. The flap valve has a base portion 54 cemented to the clip body 46 and surrounding the depressed trough on three sides. The valve has slots 56 and 58 extending back from the free edge of the valve approximately the width of the depressed trough in the clip, these slots being located just inside and parallel to the opposite sides of the trough defined by the sides 48. With this construction, the valve has a flexible flap portion 60 covering the trough, a free edge of the flexible portion lying closely adjacent one side of the trough.

As shown in Fig. 2, the trough in the clip member is wider than the opening 40 in the rear quarter panel and the free edge of the flexible flap portion 60 underlies the rear quarter panel adjacent the edge of the opening 40. Because of this construction, the flexible flap portion cannot be swung upwardly by suction in the space 14. On the contrary, suction in this space seals the drain opening tightly. The flexible flap portion does, however, permit the drainage of moisture through the opening 40.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. Automobile body sealing means of the character described, including: a clip member having a U-shaped resilient holding portion adapted to be clipped to an edge of a body panel, and a body portion extending at an angle from the clip portion, the body portion of said clip member being formed with a centrally depressed trough having an opening at its bottom; and a flap valve mounted on the body portion of said clip member, said valve having spaced slots defining a flexible flap portion covering said trough, a free edge of said flexible portion lying closely adjacent one side of said trough.

2. Apparatus of the character claimed in claim 1, wherein said holding portion of the clip member is formed with at least one barb for frictionally gripping the body panel.

3. Automobile body sealing means of the character described, including: a metal clip member having a U-shaped resilient holding portion adapted to be clipped to an edge of a body panel, said holding portion being formed with barbs for frictionally gripping the body panel, and said clip member having an integral body portion extending at a right angle from the holding portion, the body portion of the clip member being formed with a centrally depressed trough having an opening at its bottom; and a rubber flap valve mounted on the body portion of said clip member, said valve having spaced slots defining a flexible flap portion covering said trough, a free edge of said flexible portion lying closely adjacent one side of said trough.

4. Automobile body sealing apparatus of the character described, including: a body rocker panel having a substantially vertical portion comprising an exterior wall of an automobile body; an outer body panel having a substantially vertical portion spaced from said rocker panel and a substantially horizontal portion joined with said rocker panel along the lower edge thereof, said horizontal portion having a drainage opening therein; a clip member having a U-shaped holding portion adapted to be clipped to said panels at the juncture thereof and having a body portion extending at an angle from the holding portion below said opening, the body portion of said clip member being formed with a centrally depressed trough having an opening at its bottom; and a flap valve mounted on the bottom portion of said clip member, said valve having a flexible portion covering said trough, a free edge of the flexible portion lying closely adjacent one side of said trough.

5. Automobile body sealing apparatus of the character described, including: a body rocker panel having a substantially vertical portion comprising an exterior wall of an automobile body; an outer body panel having a substantially vertical portion spaced from said rocker panel, at least one of said panels having a substantially horizontal portion joined with the other panel along the lower edge thereof, and one of said panels having a drainage opening in a lower portion thereof; a clip member having a U-shaped holding portion adapted to be clipped to said panels at the juncture thereof and having a body portion extending at an angle from the holding portion, the body portion of said clip member being formed with a depressed trough lying adjacent said drainage opening, said trough having an opening therethrough; and a flap valve mounted on the body portion of said clip member, said valve having a flexible portion covering said trough, a free edge of the flexible portion lying closely adjacent one side of said trough and underlying the panel adjacent said drainage opening whereby suction into the automobile body draws the flexible portion of the valve tightly against said panel.

6. Automobile body sealing apparatus of the character described, including: a body rocker panel having a substantially vertical portion comprising an exterior wall of an automobile body; an outer body panel having a substantially vertical portion spaced from said rocker panel, at least one of said panels having a substantially horizontal portion joined with the other panel along the lower edge thereof, said horizontal portion having a drainage opening therein; a clip member having a U-shaped resilient holding portion adapted to be clipped to said panels at the juncture thereof and having a body portion extending at an angle from the holding portion, the body portion of the clip member being formed with a centrally depressed trough having an opening at its bottom; and a flap valve mounted on the body portion of said clip member, said valve having spaced slots defining a flexible flap portion covering said trough, a free edge of said flexible portion lying closely adjacent one side of said trough and underlying the panel adjacent said drainage opening whereby suction into the automobile body draws the flexible portion of the valve tightly against said panel.

References Cited in the file of this patent

UNITED STATES PATENTS

| 2,234,781 | Schjolin | Mar. 11, 1941 |
| 2,378,613 | Young et al. | June 19, 1945 |
| 2,747,922 | Gibson | May 29, 1956 |

FOREIGN PATENTS

| 621,994 | Great Britain | Apr. 25, 1949 |